United States Patent
Mani et al.

(10) Patent No.: US 10,891,638 B2
(45) Date of Patent: Jan. 12, 2021

(54) SURVEY DATA PROCESSING

(71) Applicant: TATA CONSULTANCY SERVICES LIMITED, Mumbai (IN)

(72) Inventors: Jayasekar Mani, Chennai (IN); Suresh Babu P, Chennai (IN); Padmanaban Vadivel, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 427 days.

(21) Appl. No.: 14/497,470

(22) Filed: Sep. 26, 2014

(65) Prior Publication Data

US 2015/0339684 A1 Nov. 26, 2015

(30) Foreign Application Priority Data

May 26, 2014 (IN) .......................... 1761/MUM/2014

(51) Int. Cl.
*G06Q 30/02* (2012.01)
*G09B 7/00* (2006.01)
*G09B 7/02* (2006.01)

(52) U.S. Cl.
CPC .......... *G06Q 30/0203* (2013.01); *G09B 7/00* (2013.01); *G09B 7/02* (2013.01)

(58) Field of Classification Search
None
See application file for complete search history.

(56) References Cited

U.S. PATENT DOCUMENTS

| | | | |
|---|---|---|---|
| 7,610,239 B1* | 10/2009 | Silverman | G06Q 40/00 705/35 |
| 7,958,445 B1* | 6/2011 | Kuwamoto | G06F 16/10 715/237 |
| 2002/0049627 A1 | 4/2002 | Goli et al. | |
| 2002/0052774 A1 | 5/2002 | Parker et al. | |
| 2004/0252816 A1* | 12/2004 | Nicolas | G06Q 30/02 379/92.01 |
| 2009/0287642 A1* | 11/2009 | Poteet | G06Q 30/02 |
| 2012/0095796 A1* | 4/2012 | Gately | G06Q 10/06311 705/7.13 |
| 2012/0284324 A1* | 11/2012 | Jarville | G06Q 30/0201 709/203 |
| 2013/0275259 A1* | 10/2013 | Chidambaram | G06Q 30/0269 705/26.7 |
| 2018/0070214 A1* | 3/2018 | Chalmers | H04W 4/48 |

* cited by examiner

*Primary Examiner* — Akosua Kyereme-Tuah
(74) *Attorney, Agent, or Firm* — Hamre, Schumann, Mueller & Larson, P.C.

(57) ABSTRACT

The present subject matter discloses systems(s) and method (s) for processing survey data. According to the present subject matter, the method(s) include providing a first survey question from a set of survey questions, and receiving a first response to the first survey question from a surveyee, and generating an Extensible Markup Language (XML) file for the first response for storing the first response in the XML file. The method further comprises executing a semantic analysis for the first response to determine an evaluation, and generating a second survey question dynamically from the set of survey questions based on the evaluation. The method further comprises receiving a second response to the second survey question and appending the XML file with a second data structure representing the second response, where the appended XML file is transmitted to a server at pre-defined intervals for analysis of the survey data.

6 Claims, 3 Drawing Sheets

SURVEY DATA PROCESSING

TECHNICAL FIELD

The present subject matter relates, in general, to data processing and, particularly but not exclusively, to survey data processing.

BACKGROUND

Companies often gather information in an attempt to learn more about their market, customers, and new business opportunities. Such information can be gathered through surveys. The surveys can present various questions to a surveyee about their needs, future business plans, likes and dislikes, and opinions about various topics of interest to a survey administrator. The data thus gathered from the surveyee is referred to as survey data. Survey data processing involves translating the responses on a questionnaire into a form that can be manipulated to produce statistics. The statistical information can be utilized to design and direct marketing or sales activities.

BRIEF DESCRIPTION OF DRAWINGS

The detailed description is described with reference to the accompanying figures. In the figures, the left-most digit of a reference number identifies the figure in which the reference number first appears. The same numbers are used throughout the drawings to reference like features and components.

FIG. 3 illustrates a method to process a survey, in accordance with an implementation of the present subject matter It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Method(s) and system(s) to process survey data are described. Methods can be implemented in systems that include, but are not limited to, computing devices, such as, desktop computers, hand-held devices, laptops or other portable computers, advanced cellular phones, tablets, notebooks, personal digital assistants (PDA), and the like, capable of processing survey data. Although the description herein is with reference to the hand held devices, the methods and systems may be implemented in other computing devices and systems as well, albeit with a few variations, as will be understood by a person skilled in the art.

Conventional methods for administering a survey are based on presenting one or more surveyee's with several questions on paper by a survey administrator, and each of the one or more surveyee's is requested to provide responses to each of the survey questions presented in the questionnaire. The surveyee may be an individual willing to take part in a survey conducted by a survey administrator. The survey administrator may be an individual, responsible for performing a survey. However, such methods are largely manual where large volumes of paper must be printed, thereby involving huge costs to the survey administrator. Further, the responses received by each survey administrator are collated and dispatched to data entry centers, where the survey data is processed and analyzed to arrive at a meaningful statistical data. Such conventional methods are extremely cumbersome; and involve a significant time lag between the execution and analysis of the survey data, as a result of huge processing times.

Certain conventional online survey systems have replaced the manual methods for execution of survey. Such conventional systems allow for execution of a survey through an online medium, where a set of survey questions are presented to the surveyee in the form of an electronic questionnaire, and the surveyee's are requested to provide their responses to each of the set of survey questions. In certain cases, each of the set of survey questions may be prepopulated with a set of answer choices that are listed as part of the question. Further, the responses corresponding to each of these survey questions, collected from each surveyee, may be stored in a relational database. Relational database are a set of tables which has relationship among each other and also have a fixed set of columns which are used throughout the application. However, relational databases are often associated with scalability issues where there are limitations in the data processing systems by way of speed and memory. Also, the performance of the relational database read and write times may degrade over time due to the large volumes of survey data that may be received from several surveyee's for multiple surveys.

The present subject matter describes methods and systems for processing survey data. The systems implementing the described methods on allow for dynamic generation of survey questions tailored to each surveyee based on a prior response provided by the surveyee, thereby improving the integrity of the survey data. The described methods also allows for storing the survey responses provided by each surveyee in an Extensible Markup Language (XML) database. This may be particularly helpful for storing huge volumes of unstructured or relatively less structured dynamic survey data, thereby saving considerable amount of space; and overcoming storage space constraints. The read write access to this type of database is relatively less intensive and so more suited for survey data processing environment that has to work with limited processor speed and accessible memory.

The present subject matter describes methods and systems for processing survey data. In accordance with an implementation of the present subject matter, a system to gather and process the survey data through one or more hand held devices are here with described. A system may be configured to monitor the activities of one or more survey administrators using the hand held devices. The survey administrator may be an individual, responsible for performing a survey with the help of the hand held device. In an implementation, the system may authenticate the survey administrator for the purpose of the executing a survey. The authentication may be based on the login data entered by the survey administrators through the hand held device. In an anther example, the authentication may be one or more of a biometric scan based authentication or an image capture based authentication.

Further, the system may populate a set of survey questions in each hand held device based on the authentication. Such population of the set of survey questions, further to authentication, is based on allocation parameters. The allocation parameters include at least one of an industry, geographical location and demographic characteristics. In an example the system may pre-populate a set of answer choices to each of the set of survey questions in the hand held device. In yet another example, each of the set of survey questions that are populated in the hand held device may be tagged with one or more attributes. Such a tagging is for correlating the survey questions with survey responses provided by the surveyee.

Further, a survey administrator may provide a first survey question from the set of survey questions, to a surveyee, through the hand held device. In an example, the first survey question that is provided to the surveyee may be tagged with one or more attributes. Further, each attribute from the one or more attributes is associated with a pre-defined weight, where the weight being indicative of relative importance is given to one attribute over the other attributes.

Further, the hand held device may receive a first response corresponding to the first survey question from the surveyee. In an implementation, the credibility of the first response associated with the first survey question may be determined based on a response time that has elapsed after providing the first survey question. The response time is the time taken by the surveyee to provide a first response after the generation of the first survey question, and may be pre-defined prior to execution of the survey. In an example, if the response time is lesser than a pre-defined time interval, the credibility associated with such a response may be deemed to be poor. Hence, the response corresponding to such survey question, or responses associated with such a surveyee, may not be taken into consideration while evaluating the results of the survey.

Furthermore, an XML file is generated for the first response, where a first data structure for representing the first response is stored in the XML file. In an example, the generation of the XML file is based on pre-defined rules. In one implementation, the predefined rules comprise using the survey question, or a keyword from the survey question as a key tag; and the survey response, or a keyword from the survey response as a value, and storing the survey question and survey response as a key value pair.

The XML file thus generated is more efficient in terms of storage capacities and read write access. This also ensures that each survey question and the survey response is tagged as attributes and obviates the need for structural relationship as imposed by the conventional relational databases.

Further, the hand held device may execute a semantic analysis for the first response corresponding to the first survey question. In an example, the semantic analysis includes mapping of one or more attributes in the first response to at least one attribute tagged in the first survey question. Such a mapping is to determine an evaluation associated with the first survey question. In an example, greater the mapping of the one or more attributes, greater is the evaluation associated with the first response.

Further, a second survey question from the set of survey questions is generated to the surveyee, where the generation is based on the evaluation associated with the first response. In an example, the generation of the second survey question and each subsequent survey question following the second survey question is based on a semantic analysis of the survey responses provided for the prior survey questions by the surveyee. This process is dynamic; and is iteratively continued till completion of the survey on a real-time basis. Such a dynamic generation that is tailored to each surveyee may improve the integrity of the survey data, and allows the concerned authorities to gather accurate information regarding the survey.

Furthermore, the XML file may be appended upon receiving responses for each subsequent survey question to generate an XML tree. The appended XML file may be transmitted to a server over a network at pre-defined intervals for analysis of the survey data. In a scenario, where the network connection is lost, the XML tree corresponding may be stored in the hand held device, and may be transmitted to the server upon availability of the network connection.

The systems implementing the described methods allow for dynamic generation of survey questions tailored to each surveyee based on a prior response provided by the surveyee, thereby improving the integrity of the survey data. The described methods also allows for storing the survey responses provided by each surveyee in an Extensible Markup Language (XML) database. This may be particularly helpful for storing huge volumes of unstructured or relatively less structured dynamic survey data, thereby saving considerable amount of space, and overcoming storage space constraints and processor limitations of hand held devices.

The above methods and systems are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Figure 1:
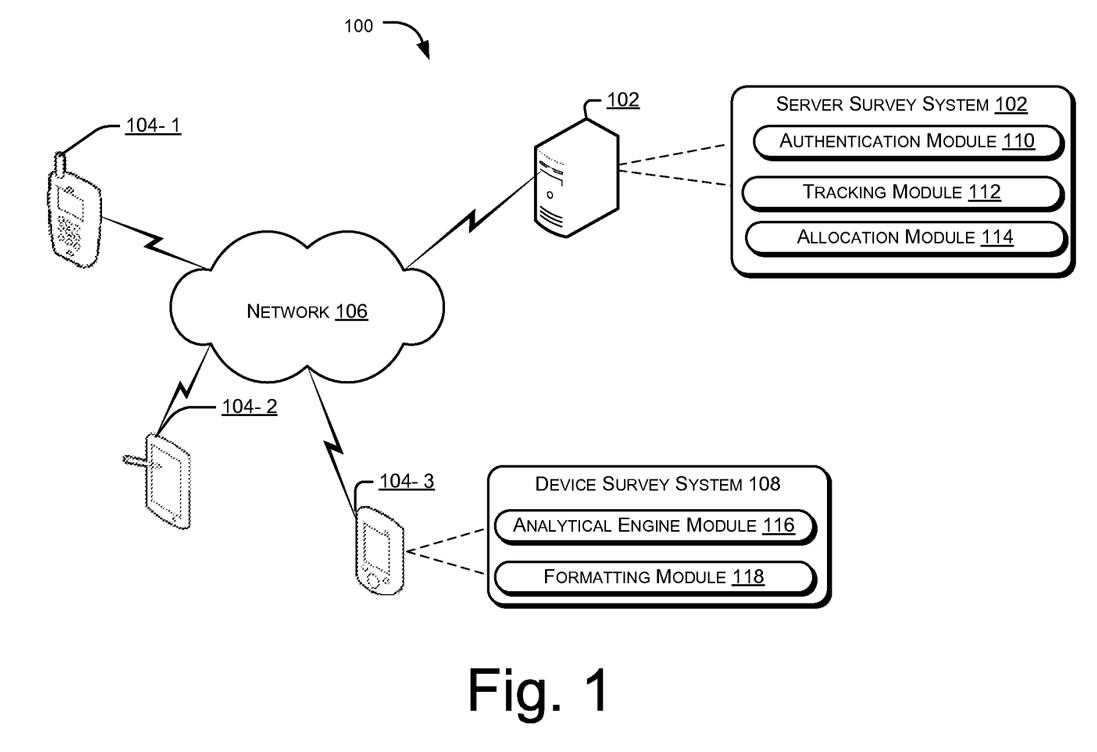
FIG. 1 illustrates a network environment implementing survey systems, in accordance with an embodiment of the present subject matter.
Figure 2:
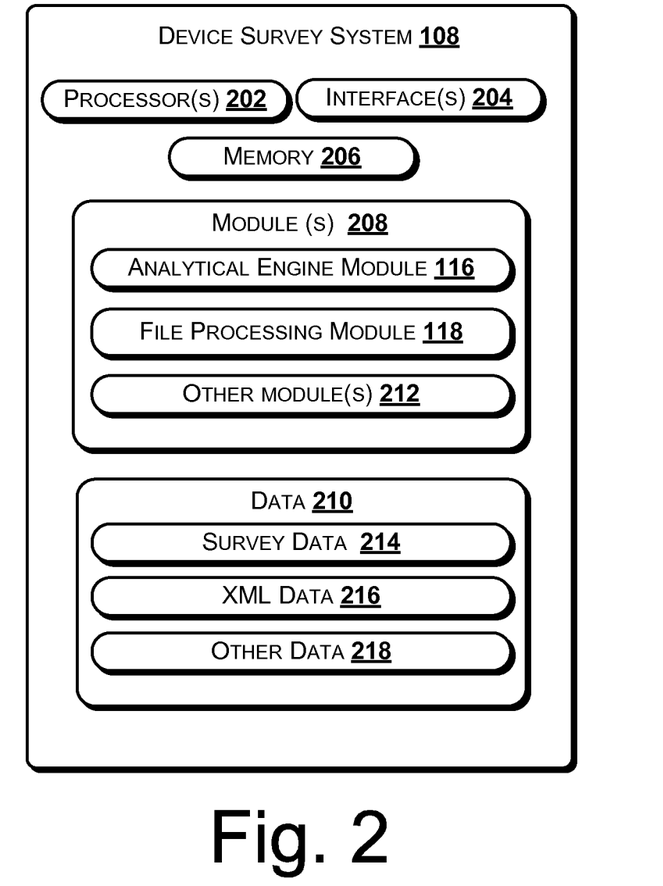
FIG. 2 illustrates components of a device survey system, in accordance with an embodiment of the present subject matter.
Figure 3:
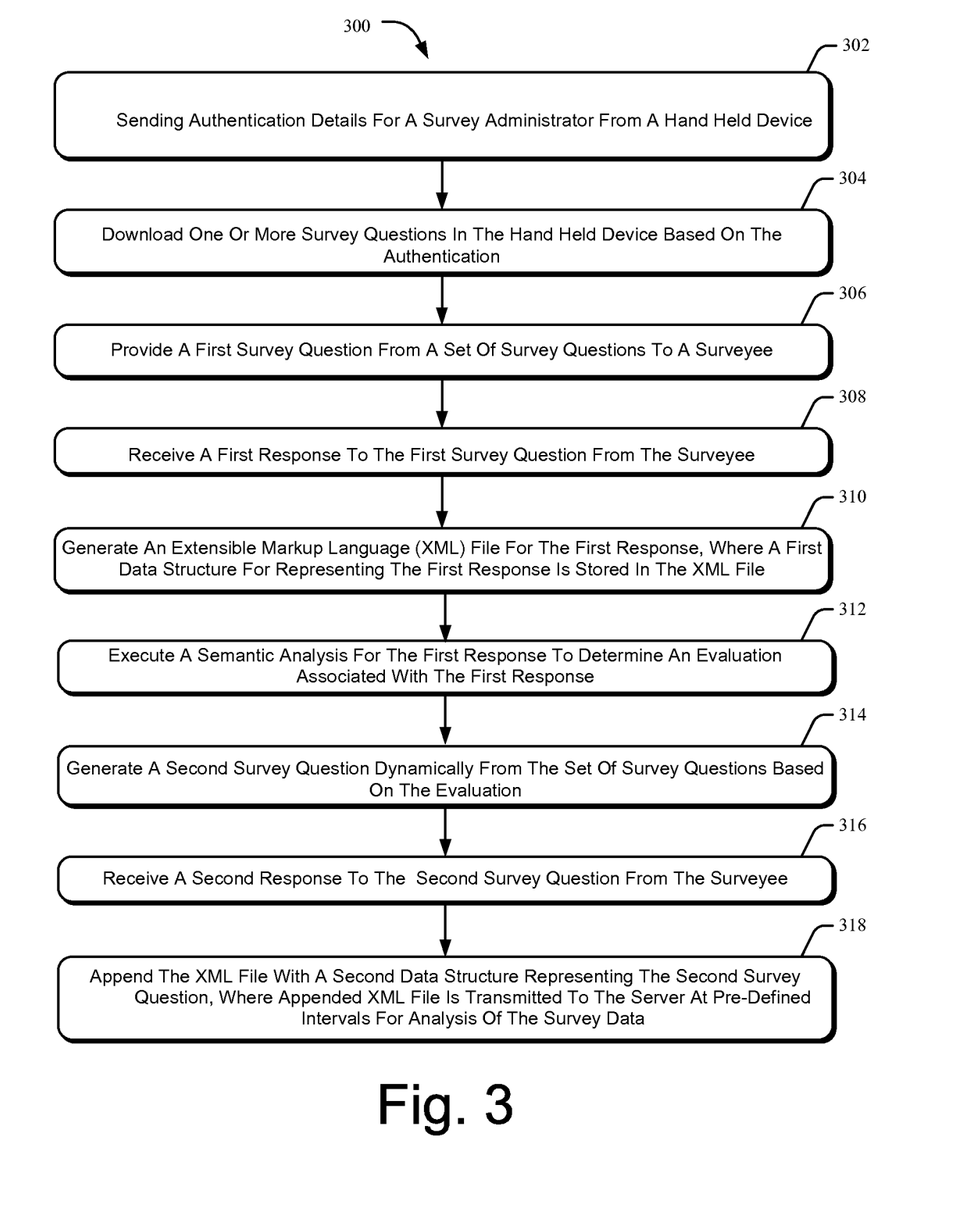

The manner in which the systems and methods shall be implemented has been explained in detail with respect to FIGS. 1, 2, and 3. While aspects of described systems and methods can be implemented in any number of different computing systems, transmission environments, and/or configurations, the implementations are described in the following system(s).

FIG. 1 illustrates a network environment 100, implementing a server survey system 102, which allows for creation and analysis of survey data gathered from one or more hand held devices, in accordance with an implementation of the present subject matter. For the purpose of explanation and simplicity, the server survey system 102 is referred to as a server system 102 hereafter. The server system 102 described herein, can be implemented in any network environment comprising a variety of network devices, including routers, bridges, servers, computing devices, storage devices, etc. In one implementation the server system 102 is connected to one or more hand held devices 104-1, 104-2, . . . , 104-N, individually and commonly referred to as hand held device(s) 104 hereinafter, through a network 106. Further, the network environment 100 also includes a device survey system 108, for processing the survey data at one or more of the hand held devices 104. For the purpose of explanation and simplicity, the device survey system 108 is referred to as a device system 108 hereafter.

The network 106 may be a wireless or a wired network, or a combination thereof. The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as gateways and routers; however, such details have been omitted for ease of understanding.

In one implementation, the server system 102 includes an authentication module, 110, a tracking module 112 and an allocation module 114. In an implementation, the authentication module 110 may be configured to authenticate a survey administrator based on login details received from the hand held device 104, associated with the survey administrator. In an example, the login details may include a username, a password, an employee code, and the like associated with the survey administrator. In another implementation, the authentication module 110 may authorize the survey administrator based on receiving a biometric scan or image capture from the hand held device 104 associated with the survey administrator. The authentication module 110 may further be configured to identify the hand held device 104 and/or the Subscriber Identification Module (SIM), associated with the survey administrator based on identification details obtained by the hand held device 104. The identification details, in an example, may include an International Mobile Equipment Identity (IMEI) number, an International Mobile Subscriber Identity (IMSI) number, SIM number, and the like associated with the hand held device 104 and the SIM.

Further, the tracking module 112 of the server system 102 may be configured to track the movement of the hand held device 104. The tracking module 112 may track the movement of the hand held device 104 based on at least one location attribute associated with the hand held device 104. The location attribute, in an example, may comprise of geometrical co-ordinates of the location in which the hand held device 104 is located. Further, based on the hand held device 104, the tracking module 112 may also be configured to track a route and time taken by the survey administrator to reach a surveyee. The time taken by the survey administrator to reach the surveyee may be tracked based on a system time of the server system 102.

In another implementation, the tracking module 112 may further be configured to remotely monitor a status of the hand held device 104 for the executing the survey. In an implementation, the status attributes may be received from the hand held device 104 in real-time or on a periodic basis. In an example, the status attributes may include a battery status, a signal strength status, and a software update status associated with the hand held device 104. In an implementation, the server system 102 may perform actions based on the received status of the hand held device 104. In an example, the server system 102 may receive periodic updates on the battery status and signal strength status of the hand held device 104. Based on the battery status and the signal strength status, the server system 102 may keep a check on false reports by the survey administrator stating "no signal" and/or "no battery" as a reason for not performing the survey. Further, based on the status attributes, the server system 102 may keep a check on unauthorized usage or tampering of the hand held device 104.

Further, the allocation module 114 of the server system 102 may populate a set of survey questions in one or more hand held devices 104 based on the authentication. Such population of the set of survey questions, further to authentication, is based on allocation parameters. The allocation parameters include at least one of an industry, geographical location and demographic characteristics. For example, consider a scenario where a survey pertaining to transportation facilities in a particular locality is to be conducted. For this purpose, it may be more apt to obtain a feedback on the transportation facilities from surveyee's residing in the same locality. Hence, the allocation module 114 interact with the tracking module 112 to determine the status of each of the one or more hand held devices 104 and may further populate the set of questions pertaining to transportation facilities to the hand held device 104 that is in vicinity to the locality. In an example, the population of the set of survey questions may be done through a file upload.

Further, each of the one or more hand held devices 104 include device survey system 108 to process the survey data 214 in the one or more hand held devices 104. The device survey system may be further referred to as the device system 108. The device system 108 comprises of an analytical engine module 116 and a XML file processing 118. The analytical engine module 116 may generate a series of survey questions from the set of survey questions, where the generation is based on response provided by the surveyee for the previous question. The file processing 118 may further generate an XML file, where the XML file includes survey responses corresponding to each of the survey questions, provided by each surveyee. The detailed aspects corresponding to each of these modules of the device system 108 are herewith explained in reference to FIG. 2.

FIG. 2 illustrates components of the device system 108, in accordance with an embodiment of the present subject matter. In one implementation, the device system 108 includes processor(s) 202. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor(s) is provided to fetch and execute computer-readable instructions stored in the memory.

Also, the device system 108 includes interface(s) 204. The interface(s) 204 may include a variety of software and hardware interfaces that allow the device system 108 to interact with the entities of the network 106, or with each other. The interfaces 204 may facilitate multiple communications within a wide variety of networks and protocol types, including wire networks, for example, LAN, PSTN, cable, etc., and wireless networks, for example, WLAN, cellular, satellite-based network, etc.

In another embodiment of the present subject matter, the device system 108 may also include a memory 206. The memory 206 may be coupled to the processor 202. The memory 206 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the device system 108 may include module(s) 208 and data 210. The modules 208 and the data 210 may be coupled to the processors 202. The modules 208, amongst other things, include routines, programs, objects, components, data structures, etc., which perform particular tasks or implement particular abstract data types. The modules 208 may also be implemented as, signal processor(s), state machine(s), logic circuitries, and/or any other device or component that manipulate signals based on operational instructions.

Further, the modules 208 can be implemented in hardware, instructions executed by a processing unit, or by a combination thereof. The processing unit can comprise a computer, a processor, a state machine, a logic array, or any other suitable devices capable of processing instructions. The processing unit can be a general-purpose processor which executes instructions to cause the general-purpose processor to perform the required tasks or, the processing unit can be dedicated to perform the required functions. In another aspect of the present subject matter, the modules 208 may be machine-readable instructions (software) which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via a network connection.

In an implementation, the module(s) 208 include an analytical engine module 116, a file processing module 118, and other module(s) 212. The other module(s) 216 may include programs or coded instructions that supplement applications or functions performed by the device system 108. In said implementation, the data 210 includes survey data 214, XML data 216, and other data 218. The other data 218 amongst other things, may serve as a repository for storing data that is processed, received, or generated as a result of the execution of one or more modules in the module(s). Although the data is shown internal to the device system 108, it may be understood that the data 210 can reside in an external repository (not shown in the figure), which may be coupled to the device system 108. The device system 108 may communicate with the external repository.

According to an implementation, the analytical engine module 116 may provide a first survey question from the set of survey questions, to a surveyee, through the hand held device 104 based on the authentication. In an example, the analytical engine module 116 may not authorize the survey administrator to execute the survey on failure to comply with authentication. In yet an other example, the analytical engine module 116 may pre-populate a set of answer choices to the first survey question for the surveyee. For example, consider a scenario, where the survey is regarding the quality of food served in a restaurant. For this purpose, the analytical engine module 116 may a first survey question, such as "How do you rate the quality of food". For this survey question, the analytical engine module may pre-populate the first survey question with answer choices, such as "good", "bad", "spicy", "warm", and "cold". In an example, the analytical engine module 116 may customize the page design for one or more survey questions of the survey. For example, the survey questions may be of a likert scale, matrix type or a multiple choice, as will be known to a person skilled in the art.

In yet another example, the first survey question may be tagged with one or more attributes. Such a tagging is for correlating the survey questions with survey responses provided by the surveyee. For example, consider a scenario where the survey is being administered regarding the quality of food served in a restaurant. There may be many possible attributes for rating the quality of food. For instance, the attributes may include good, bad, spicy and bland, cold, warm, steaming hot, stale, fresh, etc. Further, each attribute from the one or more attributes is associated with a pre-defined weight, where the weight being indicative of relative importance given to one attribute over the other attributes. Therefore, in the previous example, each of these attributes that describe the quality of food may be associated with a pre-defined weight based on its importance. For instance, the attributes, 'good', 'warm', and 'fresh', may be given a higher weight as compared the other attributes. Such a tagging is for correlating the survey questions with survey responses provided by the surveyee.

In yet another example, the analytical engine module 116 may provide a first survey question based on the surveyee. For example, it may be more apt to provide a first survey question on nutritional value of a particular brand of baby food to a mother rather than a teenager. For this purpose, the analytical engine module 116 may take into consideration the details of the surveyee, prior to executing a survey.

Further, the analytical engine module 116 may receive a first response corresponding to the first survey question from the surveyee. In an implementation, the analytical engine module 116 may determine the credibility of the first response associated with the first survey question based on a response time that has elapsed after providing the first survey question. In said implementation, the response time may be configured by a survey administrator, and if the response time is lesser than a pre-defined time interval, the credibility associated with such a response may be deemed to be poor. For example, consider that an average if a surveyee had spent 1 minute to answer a survey question. In a situation, if the surveyee had spent less than 2 seconds to respond to the survey question, it may be possible that the surveyee had not read the survey question. Hence, the response corresponding to such survey questions, or responses associated with such a surveyee, may not be taken into consideration while evaluating the results of the survey.

The analytical engine module 116 may further execute a semantic analysis for the first response corresponding to the first survey question. In an example, the semantic analysis includes mapping of one or more attributes in the first response to at least one attribute tagged in the first survey question. Such a mapping is to determine an evaluation associated with the first survey question. In continuation with the previous example, it may be possible that the surveyee might have rated the quality of food to be hot and spicy. Each attribute or a combination of attributes may be mapped to at least one attribute tagged in the first survey question. The analytical engine 116 module may further determine an evaluation associated with the first survey question based on the mapping. In an example, greater the mapping of the one or more attributes, greater is the evaluation associated with the first response.

Further, the analytical engine module 116 may generate a second survey question from the set of survey questions to the surveyee, where the generation is based on the evaluation associated with the first response. Such generation of a subsequent survey question from the set of survey questions is on a real-time basis. In an example, the analytical engine module 116 may generate the second survey question and each subsequent survey question following the second survey question is based on the responses provided for the prior survey questions by the surveyee. This process is dynamic and is performed on a real-time basis by the analytical engine module 116, and is continued till the completion of the survey.

For example, consider a scenario where the surveyee has provided a response that he is dissatisfied with the quality of a customer care service. In such a scenario, the analytical engine module 116 may provide the surveyee with a series of survey questions to identify the one or more attributes causing dissatisfaction to the surveyee. The generation of each subsequent question in such scenario is based on prior responses provided by the surveyee. Such a dynamic generation that is tailored to each surveyee may improve the integrity of the survey data, and allows the concerned authorities to gather accurate information regarding the service provided by the customer care.

The file processing 118 may further generate an XML file for each survey response provided by the surveyee. Such a generation of the XML file from the survey data 214 is based on pre-defined rules. In an example, the pre-defined rules comprise using the survey question, or keyword from the survey question as a key tag; and the survey response, or a keyword from the survey response, as a value, and storing the survey question and survey response as a key value pair. Furthermore, the XML file may be appended upon receiving responses for each subsequent survey question to generate an XML tree. In an example, the file processing 118 may transmit the appended XML file to the server system over a network 106 at pre-defined intervals for analysis of the survey data. In a scenario, where the network connection is lost, the XML tree corresponding may be stored in the hand held device 104, and may be transmitted to the server upon availability of the network connection.

According to an implementation of the present subject matter, FIG. 3 illustrates a method 300 to process survey data associated with at least one surveyee. The order in which the method 300 is described is not intended to be construed as a limitation, and any number of the described method blocks can be combined in any order to implement the method 300, or any alternative methods. Additionally, individual blocks may be deleted from the method 300 without departing from the spirit and scope of the subject matter described herein. Furthermore, the method 300 can be implemented in any suitable hardware platform(s).

The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

Further, although the method 300 may be implemented in any computing device, the method 300 is explained in context of the aforementioned device 303, for the ease of explanation.

Referring to FIG. 3, at block 302, authentication details corresponding to a survey administrator may be sent to the server for authorizing a survey administrator. In an example, the authentication may be based on the login data entered by the survey administrators through the hand held device. In an another example, the authentication may be one or more of a biometric scan or an image capture of the survey administrator through the hand held device. Such an authentication is to ensure that the authentic survey administrators execute the survey.

At block 304, a set of survey questions may be downloaded in each hand held device based on the authentication. In an example, each of the set of the survey questions may be populated in a data file format, such as an Extensible Markup Language (XML) file format. Further, the download of the set of survey questions is based on allocation parameters. Further, the allocation parameters include at least one of an industry, a geographical location, and demographic characteristics.

At block 306, a survey administrator may provide a first survey question from the set of survey questions, to a surveyee, through the hand held device. In an example, the first survey question that is provided to the surveyee may be tagged with one or more attributes. Further, each attribute from the one or more attributes is associated with a pre-defined weight, where the weight being indicative of relative importance given to the attributes over the other attributes. In an implementation, the analytic engine module may provide the first survey questions from the set of survey questions.

At block 308, a first response corresponding to the first survey question may be received from the surveyee. In an implementation, the credibility of the first response associated with the first survey question may be determined based on a response time that has elapsed after providing the first survey question. The response time is the time taken by the surveyee to provide a first response after the generation of the first survey question, and may be pre-defined prior to execution of the survey. In an example, if the response time is lesser than a pre-defined time interval, the credibility associated with such a response may be deemed to be poor.

At block 310, an XML file is generated for first response, where a first data structure for representing the first response is stored in the XML file. In an example, the XML file generated is stored in the XML data of the device survey system.

At block 312, a semantic analysis is executed for the first response corresponding to the first survey question, where the execution of the semantic analysis is to determine an evaluation. In an example, the semantic analysis includes mapping of one or more attributes in the first response to at least one attribute tagged in the first survey question. Such a mapping is to determine an evaluation associated with the first survey question. In an example, greater the mapping of the one or more attributes, greater is the evaluation associated with the first response.

At block 314, a second survey question from the set of survey questions is generated to the surveyee, where the generation is based on the evaluation associated with the first response. In an example, the generation of the second survey question is dynamic and is based on the analysis of the first response provided by the surveyee.

At block 316, a second response corresponding to the second survey question may be received from the surveyee. In an example, the generation of each subsequent survey question following the second survey question is based on the analysis of the survey responses provided for the prior survey questions by the surveyee. This process is iteratively continued till a last survey question is reached based on a dynamic flow of survey responses provided by the surveyee for each prior survey question.

At block 318, the XML file is appended with a second data structure representing the second survey question to generate an XML tree. The appended XML file may be transmitted to a server over a network at pre-defined intervals for analysis of the survey data. In an example, the XML file may be appended by the XML file processing of the device system to store/transmit the XML tree.

Although implementations for methods and systems to process the survey data are described, it is to be understood that the present subject matter is not necessarily limited to the specific features or methods described. Rather, the specific features and methods are disclosed as implementations to process the survey data.

We claim:

1. A method to process survey data based on dynamic generation of one or more survey questions, the method comprising:
providing, by a processor, a first survey question from a set of survey questions to a surveyee wherein each of the set of survey questions are tagged with a plurality of attributes wherein the first survey question is provided based on the surveyee, and wherein each of the plurality of attributes are associated with a pre-defined weight;
receiving, by the processor, a first response to the first survey question from the surveyee;
determining, by the processor, credibility of each response to the first survey question based on response time elapsed after generation of the at least one survey question and determining the status of one or more hand-held devices via interaction of an allocation module with a tracking module;
generating, by the processor, an Extensible Markup Language (XML) file for the first response, wherein a first data structure for representing the first response is stored in the XML file and wherein the generation of the XML file is based on using at least one of the first survey question, a keyword from the first survey question, the first response to the first survey question and a keyword from the first response to the first survey question; and wherein the first data structure is stored as a key value pair;
executing, by the processor, a semantic analysis for the first response to determine an evaluation associated with the first response wherein the semantic analysis includes mapping of at least one attribute in the first response with at least one attribute tagged from the plurality of attributes in the first survey question;
monitoring, by the processor based on the semantic analysis and mapping of the at least one attribute, at least one of a geographical location, signal strength, survey completion status and battery status of the at least one hand held device at a pre-defined time interval;
checking, by the processor, at least one of unauthorized usage and tampering of the at least one hand held device based on one or more status attributes, wherein the one or more status attributes comprise at least one of the battery status and the signal strength and wherein the one or more status attributes are received from the one or more hand-held devices in at least one of a real time and a periodic manner;
iteratively generating, by the processor, a second survey question dynamically from the set of survey questions based on the evaluation wherein such iterative generation of the second survey question continues till the completion of survey on a real-time basis, wherein the dynamic generation is performed for each surveyee;
receiving, by the processor, a second response to the second survey question from the surveyee; and
appending, by the processor, the XML file with a second data structure representing the second survey question to generate an XML tree, wherein appended XML file is transmitted to a server at pre-defined intervals for analysis of the survey data, and wherein when a connection with the server is lost, the XML tree is stored until restoration of the connection with the server.

2. The method as claimed in claim 1, wherein the processing of survey data is performed in at least one hand held device, wherein the at least one hand held device is associated with a unique identification number (UIN), and wherein the UIN includes at least one of a Subscriber Identification Module (SIM), International Mobile Station Equipment Identity (IMEI) number and mobile number, and wherein the UIN allows for tracking of the at least one hand held device.

3. The method as claimed in claim 1 further comprises receiving an authentication for a survey administrator prior to execution of the survey, wherein the authentication is performed upon sending at least one of login details, biometric scan, and image capture of the survey administrator from the at least one hand held device.

4. The method as claimed in claim 3 further comprises downloading a plurality of survey questions in the one or more hand held devices based on the authentication, wherein the download is based on allocation parameters.

5. A device survey system to process survey data based on dynamic generation of one or more survey questions in one or more hand held devices, the device survey system comprising:
a processor;
an analytical engine module coupled to the processor to:
provide a first survey question from a set of survey questions to a surveyee wherein each of the set of survey questions are tagged with a plurality of attributes; wherein the first survey question is provided based on the surveyee, and wherein each of the plurality of attributes are associated with a pre-defined weight;
receive a first response to the first survey question from the surveyee;
determine credibility of each response to the first survey question based on response time elapsed after generation of the at least one survey question and determine the status of one or more hand-held devices via interaction of an allocation module with a tracking module;
execute a semantic analysis for the first response to determine an evaluation associated with the first response, wherein the semantic analysis includes mapping of at least one attribute tagged from the plurality of attributes in the first survey question;
generate a second survey question dynamically from the set of survey questions based on the evaluation and wherein the generation of the XML file is based on using at least one of the first survey question, a keyword from the first survey question, the first response to the first survey question and a keyword from the first response to the first survey question;
receive a second response to the second survey question from the surveyee; a file processing coupled to the processor to:
monitor based on the semantic analysis and mapping of the at least one attribute, at least one of a geographical location, signal strength, survey completion status and battery status of the at least one hand held device at a pre-defined time interval;

check at least one of unauthorized usage and tampering of the at least one hand held device based on one or more status attributes, wherein the one or more status attributes comprise at least one of the battery status and the signal strength and wherein the one or more status attributes are received from the one or more hand-held devices in at least one of a real time and a periodic manner;

iteratively generate an XML file for the first response, wherein a first data structure for representing the first response is stored in the XML file wherein such iterative generation of the second survey question continues till the completion of survey on a real-time basis, wherein the dynamic generation is performed for each surveyee; and append the XML file with a second data structure representing the second response to generate an XML tree, wherein appended XML file is transmitted to a server at pre-defined intervals for analysis of the survey data and wherein if a connection with the server is lost, the XML tree is stored until restoration of the connection with the server.

6. The device survey system as claimed in claim 5, wherein the at least one hand held device is associated with a Unique Identification Number (UIN), wherein the UIN includes at least one of a Subscriber Identification Module (SIM), International Mobile Station Equipment Identity (IMEI) number and mobile number, and wherein the UIN allows for tracking of the at least one hand held device.

\* \* \* \* \*